United States Patent
Gschwind (10) Patent No.: US 10,534,610 B2
(45) Date of Patent: Jan. 14, 2020

(54) PC-RELATIVE ADDRESSING AND TRANSMISSION

(71) Applicant: International Business Machines Corporation, Armonk, NY (US)

(72) Inventor: Michael Karl Gschwind, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 425 days.

(21) Appl. No.: 15/214,878

(22) Filed: Jul. 20, 2016

(65) Prior Publication Data

US 2018/0024835 A1    Jan. 25, 2018

(51) Int. Cl.
  *G06F 9/30* (2018.01)
  *G06F 9/38* (2018.01)
  *G06F 9/355* (2018.01)

(52) U.S. Cl.
  CPC ........ *G06F 9/30185* (2013.01); *G06F 9/3017* (2013.01); *G06F 9/3557* (2013.01); *G06F 9/3867* (2013.01)

(58) Field of Classification Search
  None
  See application file for complete search history.

(56) References Cited

U.S. PATENT DOCUMENTS

| | | | |
|---|---|---|---|
| 5,226,129 A | 7/1993 | Ooi et al. | |
| 5,371,711 A | 12/1994 | Nakayama | |
| 5,485,587 A | 1/1996 | Matsuo et al. | |
| 6,044,460 A | 3/2000 | Eckner et al. | |
| 6,055,621 A * | 4/2000 | Puzak | G06F 9/3802 712/207 |
| 6,151,673 A | 11/2000 | Matsuo et al. | |
| 6,662,295 B2 | 12/2003 | Yamaura | |
| 7,234,040 B2 * | 6/2007 | Berg | G06F 9/342 711/137 |
| 8,838,945 B2 | 9/2014 | Leijten et al. | |
| 8,954,711 B2 | 2/2015 | Stephens et al. | |

* cited by examiner

*Primary Examiner* — Corey S Faherty
(74) *Attorney, Agent, or Firm* — Patterson + Sheridan, LLP (57) ABSTRACT

Techniques for processing instructions include receiving a plurality of instructions from a program counter (PC) operable to be fused into a PC-relative plus offset instruction. The technique also includes fusing the plurality of instructions into an internal operation (IOP) that specifies PC-relative addressing with an offset. The technique also includes computing a shared PC portion that includes one or more common upper bits of a PC address of each of the plurality of instructions. If the shared PC portion is different than a previously computed shared PC portion, the technique transmits the shared PC portion to one or more downstream components in the processor pipeline. The technique further includes transmitting the IOP with a representation of lower order bits of the PC address and processing the IOP.

20 Claims, 4 Drawing Sheets

PC-RELATIVE ADDRESSING AND TRANSMISSION

BACKGROUND

The present invention relates to computer processing, and more specifically, to program counter (PC) relative addressing in a reduced instruction set computing (RISC) instruction set architecture (ISA).

Many RISC architectures do not have a PC-relative addressing mode. PC-relative addressing specifies an address for an instruction that is a defined offset from a current instruction and pointed to by the program counter or instruction address register. PC-relative addressing may be used to load an address of the data item (PC+offset) or load the data item itself by specifying the location of the data item (e.g., a number of bytes ahead of or behind the instruction). RISC architectures are limited in the size of the offset the architecture can employ. The offset may be limited to 16 bits, but at least a 32 bit offset is often needed.

One workaround is to use an add shifted immediate instruction. This command adds a 16-bit immediate value to the upper 16 bits of a 32-bit register, or to bit positions 32 to 47 of a 64-bit register (using big-endian bit numbering of the 64-bit register). Therefore, a 32-bit offset computation is performed in two steps instead of one step, by first adding a set of immediate bits that are shifted and added to compute high-order bits of an offset, and then adding a second set of immediate bits representing the low-order bits of the computed offset. However, this is an expensive solution because it adds an additional operation.

Another workaround involves the use of an extra register that points directly to the data, so that the data is only a small offset away from the register. However, this requires the cost of initializing an extra register. Addressing data using a PC-relative addressing mode, i.e., computing a data address as PC+offset, is more efficient than using an extra register.

One difficulty in using PC-relative addressing is that a very wide bus is needed to transfer a 64-bit address from the instruction fetch and decode unit, where the PC and offset values are available, to the units where the address is to be used. Not only do the 64 bits of the address need to be transferred, but also the displacement that is added to the address needs to be transferred. The total data transferred could be up to 96 bits. Additionally, the PC value must be transferred from an instruction fetch address register (IFAR) or equivalent at one end of the processing pipeline to execution units (such as a fixed point unit (FPU) or load store unit (LSU)) for computing a PC-relative address at another end of the processing pipeline. Transferring a 64 to 96 bit value across this distance is an expensive, difficult, and slow solution.

SUMMARY

One embodiment of the present invention is a method for processing instructions in a processing pipeline. The method includes receiving a plurality of instructions from a program counter (PC) operable to be fused into a PC-relative plus offset instruction. The method also includes fusing the plurality of instructions into an internal operation (IOP) that specifies PC-relative addressing with an offset. The method further includes computing a shared PC portion comprising one or more common upper bits of a PC address of each of the plurality of instructions. If the shared PC portion is different than a previously computed shared PC portion, the method includes transmitting the shared PC portion to one or more downstream components in the processor pipeline. The method also includes transmitting the IOP with a representation of lower order bits of the PC address and processing the IOP.

Another embodiment of the present invention is a system for processing instructions in a processing pipeline. The system comprises a processor and a memory storing a program, which, when executed on the processor, performs an operation for processing instructions, the operation comprising receiving a plurality of instructions from a program counter (PC) operable to be fused into a PC-relative plus offset instruction. The operation further comprises fusing the plurality of instructions into an internal operation (IOP) that specifies PC-relative addressing with an offset. The operation also comprises computing a shared PC portion comprising one or more common upper bits of a PC address of each of the plurality of instructions. If the shared PC portion is different than a previously computed shared PC portion, the operation comprises transmitting the shared PC portion to one or more downstream components in the processor pipeline. The operation also comprises transmitting the IOP with a representation of lower order bits of the PC address processing the IOP.

Another embodiment of the present invention is a non-transitory computer-readable storage medium having computer-readable program code embodied therewith, the computer-readable program code configured to perform the operations described above.

BRIEF DESCRIPTION OF THE SEVERAL VIEWS OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments described herein disclose techniques for fusing instructions to create a full PC+32 bit offset capability. In addition, an improved transmission scheme is utilized for the fused data. The PC values of instructions that are next to each other have very similar values. In many cases, the upper bits of the PC are shared. Instead of transmitting the entire value, only the difference from the previous PC value can be transmitted, or only the low order bits can be transmitted. This solution reduces the amount of data that needs to be transmitted to other components in the processing pipeline.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Figure 1:
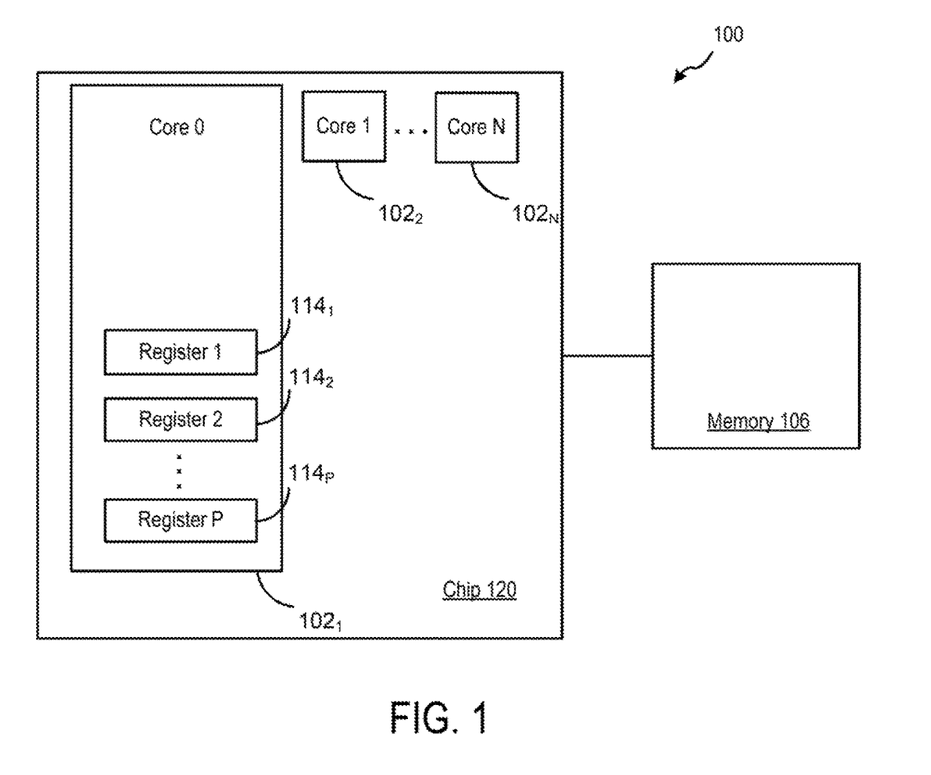
FIG. 1 illustrates a computing system for performing error correction, according to one embodiment described herein.

FIG. 1 illustrates a computer system 100 according to one embodiment. The computer system 100 includes a chip 120 that includes one or more processor cores 102, shown as Core 1, Core 2, . . . , Core N. Embodiments described herein may utilize any number N of processor cores. In other embodiments, components of system 100 shown as on chip 120 may be located off the chip, and components of system 100 shown as off chip 120 may be located on the chip.

Computer system 100 also comprises memory 106. Memory 106 may comprise a random access memory (RAM), a read-only memory (ROM), an erasable programmable read-only memory (EPROM or Flash memory), an optical storage device, a magnetic storage device, or any suitable combination of the foregoing. Memory 106 is operable to store data that may be retrieved for computing operations. Memory 106 may also comprise memory that is on chip 120 and/or within cores 102.

Computer system 100 also comprises registers 114. Embodiments described herein may utilize any number P of registers 114, and each register 114 may be any length. Registers 114 store bits of information that can be read out or written. Registers 114 may be vector registers, general purpose registers, special purpose registers, or any other suitable register type. Although illustrated outside of cores 102 in FIG. 1, one or more registers 114 may be located within the cores 102. Each core 102 may comprise one or more execution slices for multithreading operation. The execution slices comprise an execution pipeline as described in further detail below. The pipelines represent multiple sequential steps for executing multiple computer instructions in parallel—e.g., a register load, add, copy, etc. To execute the computer instruction, the pipelines may send requests to store data in, or read data from, the registers 114. In embodiments described herein, instructions are fused and an improved transmission scheme in the execution pipeline is utilized to implement PC relative addressing.

Figure 2:
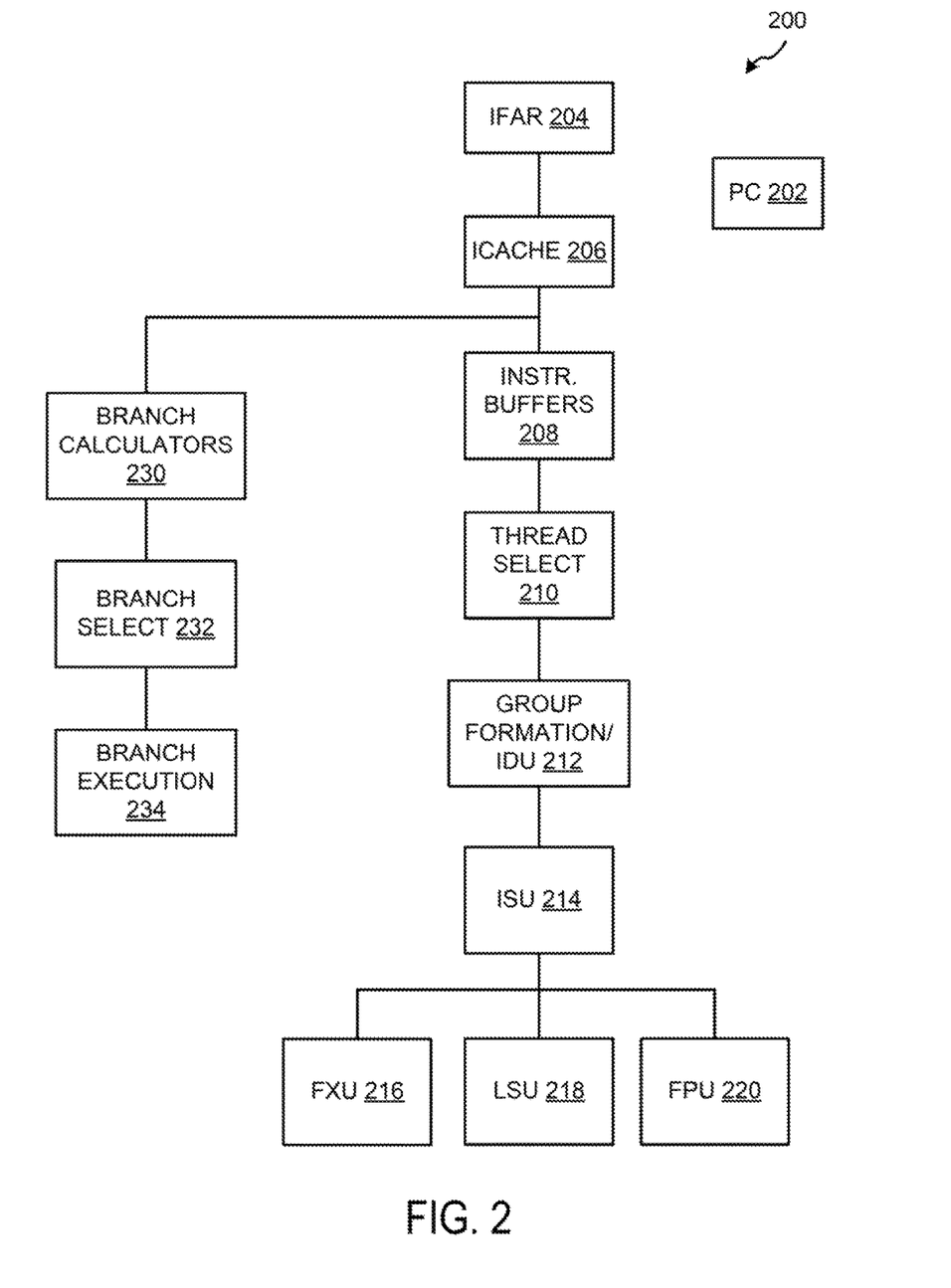
FIG. 2 illustrates example execution pipelines according to one embodiment.

FIG. 2 illustrates an example processing pipeline 200 according to one embodiment. Only a portion of the components in processing pipeline 200 are shown for simplicity. Processing pipeline may be embodied in a RISC processor that includes, among other things, prediction hardware, registers, caches, decoders, and instruction execution units.

An instruction fetch unit (IFU) may contain, among other things, an instruction fetch address register (IFAR) 204, which stores the address for the next instruction fetch. The instruction cache 206 can store a plurality of instructions. Instruction buffers 208 may be used to buffer instructions or groups from instructions from instruction cache 206. Thread select 210 can select threads from instruction buffer 208.

Block 212 illustrates an instruction decode unit (IDU) and group formation unit. IDU 212 reads the instruction and sends the component pieces of the instruction to the necessary destinations.

A program counter 202 may be part of the IFAR 204 or another register within the processing pipeline 200. Program counter 202 accesses instruction cache 206 to fetch instructions. Program counter 202 indicates where a computer program is in its program sequence by pointing to a next instruction to be executed.

Instruction sequencing unit (ISU) 214 issues instructions to various units for execution, such as the fixed point unit (FXU) 216, the load-store unit (LSU) 218, or the floating point unit (FPU) 220. Although FIG. 2 is just a conceptual diagram, program counter 202 is located a relatively large distance away from the execution units on the processor chip. This large distance makes it difficult and expensive to transmit a large amount of data from the program counter 202 to the execution units.

Techniques described herein comprise fusing instructions to create a full PC+32 bit offset capability. In addition, an improved transmission scheme is utilized for the fused data. These techniques reduce the amount of transmitted data. Rather than sending a full PC value, the locality of instructions is used to the system's advantage. The PC values of instructions that are next to each other have very similar values. In many cases, the upper bits of the PC are shared. Instead of transmitting the entire value, only the difference from the previous PC value can be transmitted, or only the low order bits can be transmitted.

Subsequent instructions in a program are often located next to each other in memory. As an example, a RISC architecture may use four bytes to denote an instruction. The high order bits of the program counter 202 may stay unchanged from one instruction to the next, with only the lower order bits changing. A copy of the upper bits of the program counter 202 can be stored near the location in the processing pipeline 200 where the data addresses are utilized, such as near LSU 218 or FPU 220. Then, only the low bits of the instruction (for example, from IDU 212) need to be transmitted to LSU 218 or FPU 220. LSU 218, FPU 220, or other components in the pipeline 200 combine the stored upper bits with the received lower bits and proceed with executing the instruction or instructions. Therefore, the full PC values do not have to be transmitted to the other components in the pipeline 200.

In addition, update transactions are performed when the upper bits of program counter 202 change. Commands may be sent from IDU 212 or an instruction fetch unit (IFU) where instructions are initially processed to the LSU 218 or other location that use data addresses only when the upper bits change.

In accordance with one embodiment of the present invention, the ISA implements an addpcis instruction, "addpcis rt, offset" that computes a value (PC)+sign_extend(offset) <<16, to be written to the register specified by the operand rt. In accordance with one embodiment, an exemplary sequence:

addpcis R5, dh
   ld R5, R5, dl may be translated into a single operation loading the doubleword at memory address PC+sign_extend(dh)<<16+sign_extend(dl).

In accordance with another embodiment, a PC-relative addressing prefix providing an indication to use PC-relative addressing in conjunction with a next instruction, as well as supplying high order address bits may be specified, e.g., in an exemplary sequence such as:

PCREL dh
   LD R5, R0, dl which may be translated into a single operation loading the doubleword at memory address PC+sign_extend (dh<<16|dl).

In accordance with the notation used herein, PC indicates the value of an instruction's address, or a value representing the instruction's address augmented by a value specified by the architectural specification of the instruction. The operator+indicates an addition, the operator << indicates the shifting of a first operand by a second operand, and the operator specifies the logical OR of the first and second operand; e.g., as commonly used in the C and C++ programming languages.

Figure 3:
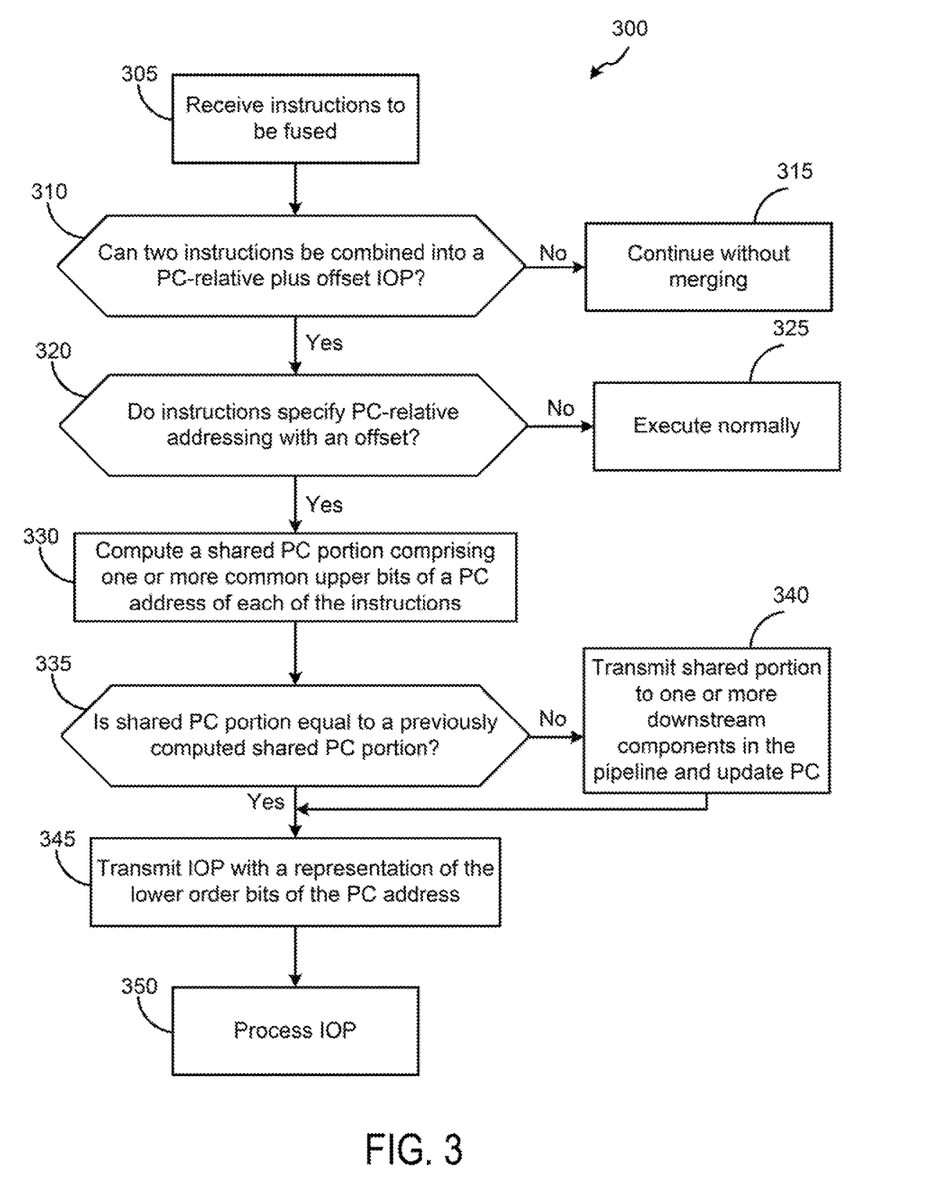
FIG. 3 is a flow chart for processing instructions from memory, according to one embodiment.

FIG. 3 is a flowchart illustrating an example method 300 for processing instructions from memory, according to one embodiment. Although the method steps are described in conjunction with the systems of FIGS. 1-2, persons skilled in the art will understand that any system configured to perform the method steps, in any order, falls within the scope of the present invention. In various embodiments, the hardware and/or software elements described above in FIGS. 1-2 can be configured to perform the method steps of FIG. 3. As an example, processor chip 120 can perform the steps of FIG. 3.

The method begins at step 305, where instructions to be fused are received. Instructions can be fused in any suitable location in processing pipeline 200, by any suitable component or components. In one embodiment, instruction fusion is performed by logic associated to instruction buffers 208, or by logic associated to group formation 212, e.g., instruction decode logic.

The method proceeds to step 310, where it is determined if two instructions can be combined into a PC-relative plus offset internal operation (IOP). An IOP is formed when multiple instructions are combined into one instruction. The IOP may not exist in the instruction set for the processor, but the processor treats the IOP like a normal instruction and properly processes the IOP.

If two instructions cannot be combined into an IOP, the method proceeds to step 315, where normal processing continues without merging the instructions. If the instructions can be combined, the method proceeds to step 320.

At step 320, the method determines the merged instructions specify PC-relative addressing with an offset. If not, the method proceeds to step 325 and normal processing and continues. If the merged instructions do specify PC-relative addressing with an offset, the method proceeds to step 330.

At step 330, the method computes a shared PC portion comprising one or more common upper bits of a PC address of each of the instructions. The shared PC portion is stored by one or more downstream components in the processing pipeline 200. In one embodiment, an IDU 212, ISU 214, and/or executions units (such as LSU 218 or FPU 220) may store the shared PC portion for processing PC-relative instructions. Instruction decode logic may be used to track which upper bits are stored in the downstream components by maintaining a copy of the shared value in the instruction decode logic. Then, instruction decode logic can check to see if there has been a change in these upper bits that needs to be communicated to each of the downstream components that is caching a PC upper-bit value.

The method proceeds to step 335, where the method determines whether the shared PC portion is equal to a previously computed shared PC portion. If it is not (i.e., the shared PC portion has changed), the method proceeds to step 340 where the new shared PC portion is transmitted to one or more downstream components in the pipeline and those components update their respective stored PC portion. At that point, the downstream components will be ready to accept the next instruction using PC-relative addressing and the method proceeds to step 345.

If the shared PC portion is equal to the previously computed shared PC portion in step 335, the method also proceeds to step 345. At step 345, the IOP for an instruction using PC-relative addressing is transmitted with a representation of the lower order bits of the PC address as well as the offset to the appropriate downstream components of pipeline 200. With the IOP, the lower order PC bits, and the offset, the downstream components can process the PC-relative instruction at step 350.

In accordance with one embodiment, when an instruction with PC-relative addressing is transmitted, a set of low-order PC bits low_pc and an offset d are transmitted. In accordance with one embodiment, a downstream processor component such as a load/store unit using the transmitted IOP to access memory computes the address to be used for access using the shared upper PC bits shared_upper_PC, the transmitted low order PC bits low_pc and the transmitted offset d as follows: (shared_upper_pc||low_pc)+sign_extend(d), where the || operator represents the concatenation of two values.

In accordance with one exemplary embodiment, the value d is computed as one of either dh<<16+sign_extend(dl), or dh<<16+dl, e.g., when used in conjunction with an ISA implementing the addpcis instruction and the PC_REL prefix, respectively.

In accordance with another embodiment, the instruction transmitted in step 345 may combine the values of d and low_pc into a set of low order address bits low_address, such that a single value low_address combining low_pc and d by adding low_pc+d is transmitted. In one embodiment, when a PC-relative instruction is transmitted where the low_pc and offset d have been combined into a single low order address bit portion, an address may be computed using a formula such as shared_upper_pc<<low_pc_bits+sign_extend(low_address) where low_pc_bits represents the number of bits in the low_pc portion which was added into the low_address.

In yet another embodiment, when a shared pointer update is transmitted in accordance with step 340, a variety of transmission methods are contemplated. In accordance with one embodiment, all bits are transmitted simultaneously. In another embodiment, a number of bits are transmitted using a plurality of transmission steps, in conjunction with performing multiple transmission steps. In yet another embodiment, rather than transmitting an updated value of a shared portion itself, an "update value" to be added or subtracted to a previously stored shared portion may be transmitted.

Figure 4:
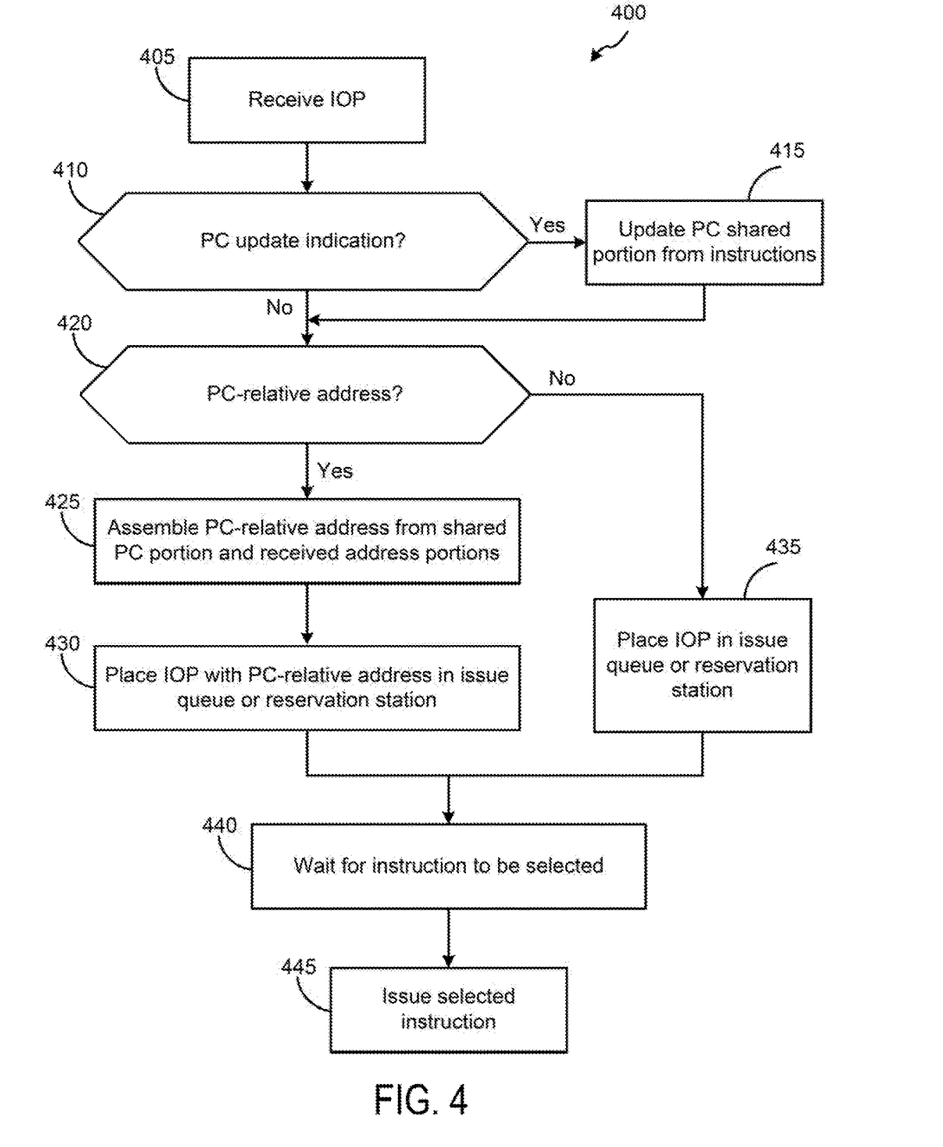
FIG. 4 is a flow chart for processing instructions from memory, according to one embodiment.

FIG. 4 is a flowchart illustrating an example method 400 for processing instructions from memory, according to one embodiment. Although the method steps are described in conjunction with the systems of FIGS. 1-2, persons skilled in the art will understand that any system configured to perform the method steps, in any order, falls within the scope of the present invention. In various embodiments, the hardware and/or software elements described above in FIGS. 1-2 can be configured to perform the method steps of FIG. 4. As an example, processor chip 120 can perform the steps of FIG. 4.

The steps illustrated in FIG. 4 may be performed in ISU 214 in one embodiment. ISU 214 can perform these steps on behalf of, for example, FXU 216, LSU 218 and FPU 220 in one location. In other embodiments, FXU 216, LSU 218, FPU 220, and/or other components may perform these steps individually.

The method begins at step 405, where an IOP is received at one or more of the downstream components in pipeline 200. In this example, the IOP is received at ISU 214. At step 410, ISU 214 checks if a PC update is indicated. If an update is indicated, the method proceeds to step 415.

At step 415, the shared PC portion is updated from the instructions accompanying the update indication. After the shared PC portion is updated, the method proceeds to step 420.

If, in step 410, no PC update is indicated, the method also proceeds to step 420. At step 420, ISU 214 determines whether the instruction uses a PC-relative address. If the instruction does not use a PC-relative address, the IOP is placed in the issue queue or a reservation station for processing in step 435. If the instruction does use a PC-relative address, the method proceeds to step 425.

At step 425, the full PC-relative address is assembled from the shared PC portion (stored in one or more downstream pipeline components of the pipeline, such as the ISU 214 presently processing the address) and received address portions of the PC-relative address. The received address portions are the lower portions of the PC-relative address. The transmission of the lower portions is described above with respect to FIG. 3. A variety of ways to store and transmit shared PC portions may be used as described in conjunction with FIG. 3. A number of ways to transmit low order PC portions and offsets used for PC-relative addressing in instructions may be used as described in conjunction with FIG. 3. After the address is assembled, the method proceeds to step 430.

At step 430, the IOP with its PC-relative address is placed in an issue queue or reservation station. The method proceeds to step 440, where the instruction is in queue for selection. At step 445, the instruction is selected and issued for execution.

As described above, the upper bits of the PC-relative address are transmitted to downstream components and updated as needed. The shared portion and the updates can be transmitted in a number of various ways. For example, one method to transmit an update to the shared PC portion is to just transmit any new upper bits that are different than the stored or cached upper bits. Often, only a small number of the upper bits need to be transmitted, instead of all of the upper bits. In other words, only the upper bits that are actually updated are transmitted. Because this type of update is a small update, the updated may be added to another instruction that is being transmitted to the downstream components.

In another embodiment, IDU 212 can send a delta update of the PC value. The delta is the difference between the new shared PC value and the old shared PC value. The delta update is transmitted to ISU 214 or other downstream component(s). On receipt of the delta update, the new shared PC value is computed by adding the delta to the stored shared PC value.

In some embodiments, an update can be sent as an IOP. The downstream components receive and execute the IOP and perform the update.

The update of the shared portion of the PC can be transmitted at different times in various embodiments. In one embodiment, the update is only sent when a PC-relative access is to be performed. In other words, if an update occurs but no component will be referencing the newly updated address, then the update does not need to be transmitted to any downstream components. In another embodiment, the PC update is sent to the downstream components any time the shared value changes.

For embodiments that utilize hardware multithreading, each thread can have its own cache and upper portion of a PC stored in the ISU. In another embodiment, a single PC is used, and a thread switch forces an update of the PC. The former solution requires more hardware resources, while the latter requires more updates be performed. In either embodiment, if a flush occurs or another action that changes the value of the PC, an update is made to the cached portions of the PC in the processing pipeline components. The update can either be forced immediately or updated on the next use of the PC.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method for processing instructions in a processor pipeline, comprising:
   receiving a plurality of instructions from a program counter (PC) operable to be fused into a PC-relative plus offset instruction;
   fusing the plurality of instructions into an internal operation (IOP) that specifies PC-relative addressing with an offset;
   computing a shared PC portion comprising one or more common upper bits of a PC address of each of the plurality of instructions;
   if the shared PC portion is different than a previously computed shared PC portion, transmitting the shared PC portion to one or more downstream components in the processor pipeline;
   transmitting the IOP with a representation of lower order bits of the PC address; and
   processing the IOP.

2. The method of claim 1, wherein the representation of lower order bits of the PC address further comprises a difference from a previous PC address.

3. The method of claim 1, wherein the representation of lower order bits of the PC address further comprises one or more lower order bits of the PC address.

4. The method of claim 1, wherein transmitting the IOP further comprises transmitting the IOP to an instruction sequencing unit (ISU) in the processor pipeline.

5. The method of claim 4, wherein the ISU assembles a PC-relative address from the shared PC portion and the representation of the lower order bits of the PC address.

6. The method of claim 5, wherein the ISU places the IOP with the PC-relative address in an issue queue for selection.

7. The method of claim 1, wherein transmitting the shared PC portion to one or more downstream components in the processor pipeline comprises transmitting the shared PC portion to an ISU.

8. The method of claim 4, wherein the ISU assembles a PC-relative address from the previously computed shared PC portion and the representation of the lower order bits of the PC address.

9. The method of claim 1, wherein an ISU receives the shared PC portion and updates a shared PC portion stored in the ISU.

10. The method of claim 1, wherein transmitting the shared PC portion comprises transmitting a delta update of the shared PC portion.

11. A system, comprising:
a processor; and
a memory storing a program, which, when executed on the processor, performs an operation for processing instructions, the operation comprising:
receiving a plurality of instructions from a program counter (PC) operable to be fused into a PC-relative plus offset instruction;
fusing the plurality of instructions into an internal operation (IOP) that specifies PC-relative addressing with an offset;
computing a shared PC portion comprising one or more common upper bits of a PC address of each of the plurality of instructions;
if the shared PC portion is different than a previously computed shared PC portion, transmitting the shared PC portion to one or more downstream components in the processor pipeline;
transmitting the IOP with a representation of lower order bits of the PC address; and
processing the IOP.

12. The system of claim 11, wherein the representation of lower order bits of the PC address further comprises a difference from a previous PC address.

13. The system of claim 11, wherein the representation of lower order bits of the PC address further comprises one or more lower order bits of the PC address.

14. The system of claim 11, wherein transmitting the IOP further comprises transmitting the IOP to an instruction sequencing unit (ISU) in the processor pipeline.

15. The system of claim 14, wherein the ISU assembles a PC-relative address from the shared PC portion and the representation of the lower order bits of the PC address.

16. A computer program product for processing instructions, the computer program product comprising a non-transitory computer-readable storage medium having computer-readable program code embodied therewith, the computer-readable program code executable by a processor to cause the processor to:
receive a plurality of instructions from a program counter (PC) operable to be fused into a PC-relative plus offset instruction;
fuse the plurality of instructions into an internal operation (IOP) that specifies PC-relative addressing with an offset;
compute a shared PC portion comprising one or more common upper bits of a PC address of each of the plurality of instructions;
if the shared PC portion is different than a previously computed shared PC portion, transmit the shared PC portion to one or more downstream components in the processor pipeline;
transmit the IOP with a representation of lower order bits of the PC address; and
process the IOP.

17. The computer program product of claim 16, wherein the representation of lower order bits of the PC address further comprises a difference from a previous PC address.

18. The computer program product of claim 16, wherein the representation of lower order bits of the PC address further comprises one or more lower order bits of the PC address.

19. The computer program product of claim 16, wherein transmitting the IOP further comprises transmitting the IOP to an instruction sequencing unit (ISU) in the processor pipeline.

20. The computer program product of claim 19, wherein the ISU assembles a PC-relative address from the shared PC portion and the representation of the lower order bits of the PC address.

* * * * *